US012629723B2

(12) United States Patent
Olson et al.

(10) Patent No.: US 12,629,723 B2
(45) Date of Patent: May 19, 2026

(54) ADAPTIVE LUMBER MANAGEMENT

(71) Applicant: Mercer Mass Timber LLC, Spokane Valley, WA (US)

(72) Inventors: Brent David Olson, Liberty Lake, WA (US); Carl Daniel Morrow, Spokane Valley, WA (US); Mengzhe Gu, Spokane Valley, WA (US); Sam Hermann, Chattaroy, WA (US); William August Hoiles, Oakville, CA (US); Gary Fong, Cupertino, CA (US)

(73) Assignee: Mercer Mass Timber LLC, Spokane Valley, WA (US)

( * ) Notice: Subject to any disclaimer, the term of this patent is extended or adjusted under 35 U.S.C. 154(b) by 0 days.

(21) Appl. No.: 18/961,328

(22) Filed: Nov. 26, 2024

(65) Prior Publication Data

US 2025/0083191 A1 Mar. 13, 2025

Related U.S. Application Data

(63) Continuation of application No. 18/435,890, filed on Feb. 7, 2024, now abandoned, which is a continuation (Continued)

(51) Int. Cl.

*B07C 5/14* (2006.01)
*B25J 9/16* (2006.01)

(Continued)

(52) U.S. Cl.

CPC ............... *B07C 5/14* (2013.01); *B25J 9/1602* (2013.01); *B25J 9/1661* (2013.01); *B25J 9/1664* (2013.01);

(Continued)

(58) Field of Classification Search

CPC ......... B07C 5/14; B25J 9/1602; B25J 9/1661; B25J 9/1664; B25J 18/00; B25J 11/00;

(Continued)

(56) References Cited

U.S. PATENT DOCUMENTS 6,439,829 B1 8/2002 Johnson
2016/0016734 A1 1/2016 Smith et al.

(Continued)

FOREIGN PATENT DOCUMENTS

JP 2014215233 A 11/2014

OTHER PUBLICATIONS

Final Office Action for U.S. Appl. No. 17/025,760, mailed Jul. 28, 2023, 9 pages.

(Continued)

*Primary Examiner* — Jacob S. Scott
*Assistant Examiner* — Miraj T. Patel
(74) *Attorney, Agent, or Firm* — Elliott, Ostrander & Preston, P.C.

(57) ABSTRACT

Lumber sorting systems and methods that use adaptive lumber management to tailor the distribution of lumber to improve the yield and aesthetic properties of a product are disclosed. An adaptive lumber management system in accordance with the present disclosure may comprise a lumber scanner configured to record one or more characteristics of each board and create a data file for each board comprising information regarding the characteristic of the board. A processor may be configured to determine a target tray for each board based on the data files. The processor may be further configured to generate at least one mapping. The system may further comprise a sorting mechanism configured to sort the plurality of boards into their respective target trays and at least one tipple configured to select each board (Continued)

or the plurality of boards from the plurality of trays according to the at least one mapping.

15 Claims, 7 Drawing Sheets

Related U.S. Application Data of application No. 17/025,760, filed on Sep. 18, 2020, now abandoned.

(60) Provisional application No. 62/902,335, filed on Sep. 18, 2019.

(51) Int. Cl.
*B25J 18/00* (2006.01)
*B65G 61/00* (2006.01)
*G06Q 50/08* (2012.01)

(52) U.S. Cl.
CPC .............. *B25J 18/00* (2013.01); *B65G 61/00* (2013.01); *G06Q 50/08* (2013.01); *B65G 2201/0282* (2013.01)

(58) Field of Classification Search
CPC . B65G 61/00; B65G 2201/0282; G06Q 50/08
See application file for complete search history.

(56) References Cited

U.S. PATENT DOCUMENTS

| | | | |
|---|---|---|---|
| 2018/0022491 | A1 | 1/2018 | Hogue et al. |
| 2021/0078047 | A1 | 3/2021 | Olson et al. |
| 2024/0173749 | A1 | 5/2024 | Olson et al. |

OTHER PUBLICATIONS

Non-Final Office Action for U.S. Appl. No. 17/025,760, mailed Mar. 10, 2023, 8 pages.

Notice of Allowance for U.S. Appl. No. 17/025,760 mailed Nov. 7, 2023, 8 pages.

Notice of Allowance for U.S. Appl. No. 18/435,890, mailed Aug. 29, 2024, 8 pages.

ADAPTIVE LUMBER MANAGEMENT

CROSS REFERENCE TO RELATED APPLICATION

This application is a continuation of U.S. patent application Ser. No. 18/435,890, filed Feb. 7, 2024, which is a continuation of of U.S. patent application Ser. No. 17/025,760, filed Sep. 18, 2020, which claims the benefit of U.S. Provisional Application No. 62/902,335, filed on Sep. 18, 2019, both of which are incorporated by reference as if fully set forth.

FIELD OF INVENTION

The present invention relates generally to lumber management. More particularly, the present invention relates to systems and methods for actively controlling lumber sorting, reorientation and placement.

BACKGROUND

Lumber distributions are variable in terms of physical, chemical, and appearance characteristics and this presents challenges for engineered wood such as mass timber composites, where properties need to be uniform and/or prescriptive. Cross-laminated timber (CLT) is an engineered wood panel product made from gluing layers of lumber together. In CLT, each layer of boards is oriented perpendicular to adjacent layers. Wane is a lack of wood on the linear edge or corner of a board. Characteristics such was wane may affect the bondable area of a board, which is the contact area available for bonding within a CLT layer and/or between CLT layers. Passive lumber management comprises imposing a limitation on the amount of a particular characteristic allowed in a given piece of lumber. Adaptive lumber management, on the other hand, comprises using process data to optimize passive thresholds and to actively control board placement. Adaptive lumber management is more effective at creating higher quality CLT and reducing the amount of boards that are rejected, thereby resulting in cost savings.

SUMMARY

Lumber sorting systems and methods that use adaptive lumber management to tailor the distribution of lumber to improve the yield and aesthetic properties of a product are disclosed. An adaptive lumber management system in accordance with the present disclosure may comprise a lumber scanner configured to record one or more characteristics of each board and create a data file for each board comprising information regarding the characteristic of the board. A processor may be configured to determine a target tray for each board based on the data files. The processor may be further configured to generate at least one mapping. The system may further comprise a sorting mechanism configured to sort the plurality of boards into their respective target trays and at least one tipple configured to select each board or the plurality of boards from the plurality of trays according to the at least one mapping.

DETAILED DESCRIPTION OF THE PREFERRED EMBODIMENTS

Systems and methods that tailor the distribution of lumber to improve the yield and aesthetic properties of a product are disclosed. The systems and methods may comprise sorting, selecting and/or reorienting boards according to data regarding board characteristics.

Figure 1:
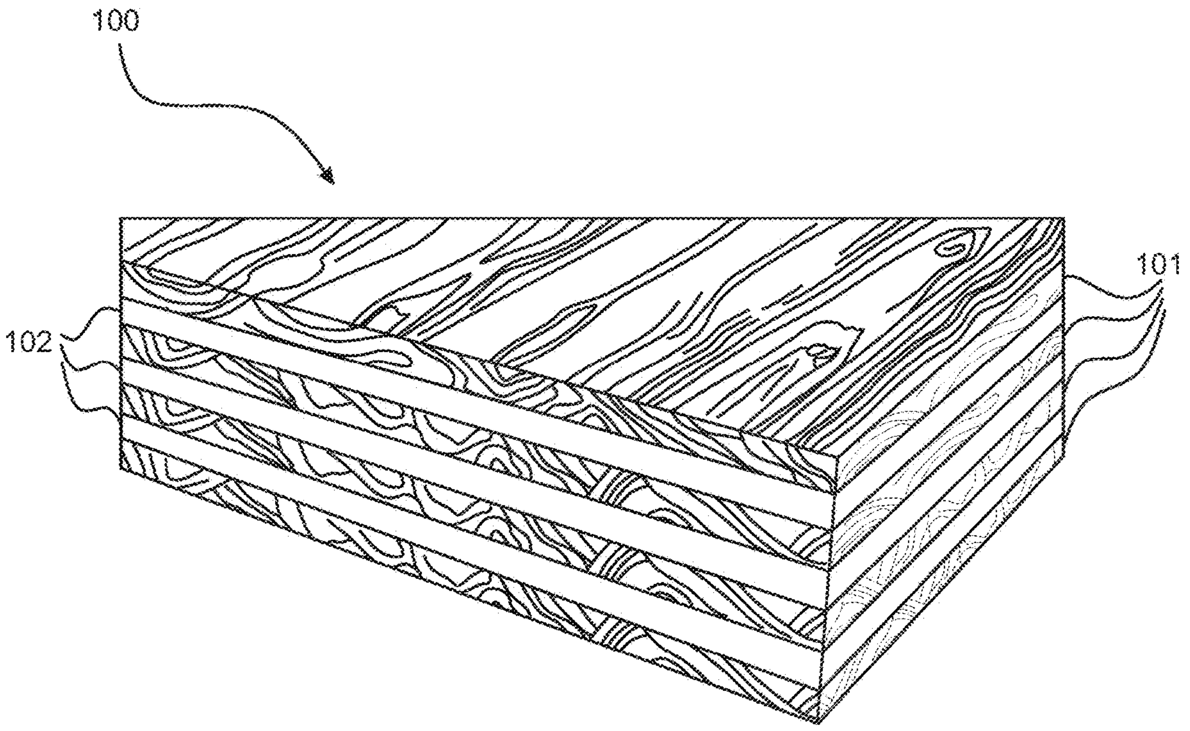
FIG. 1 is a perspective view of cross-laminated timber.

As shown in FIG. 1, cross-laminated timber (CLT) 100 is a composite material formed by assembling layers of lumber by stacking alternate longitudinal layers 101 and transverse layers 102. The longitudinal layers 101 are assembled through end joining lumber to create a unit of the appropriate length.

Figure 2:
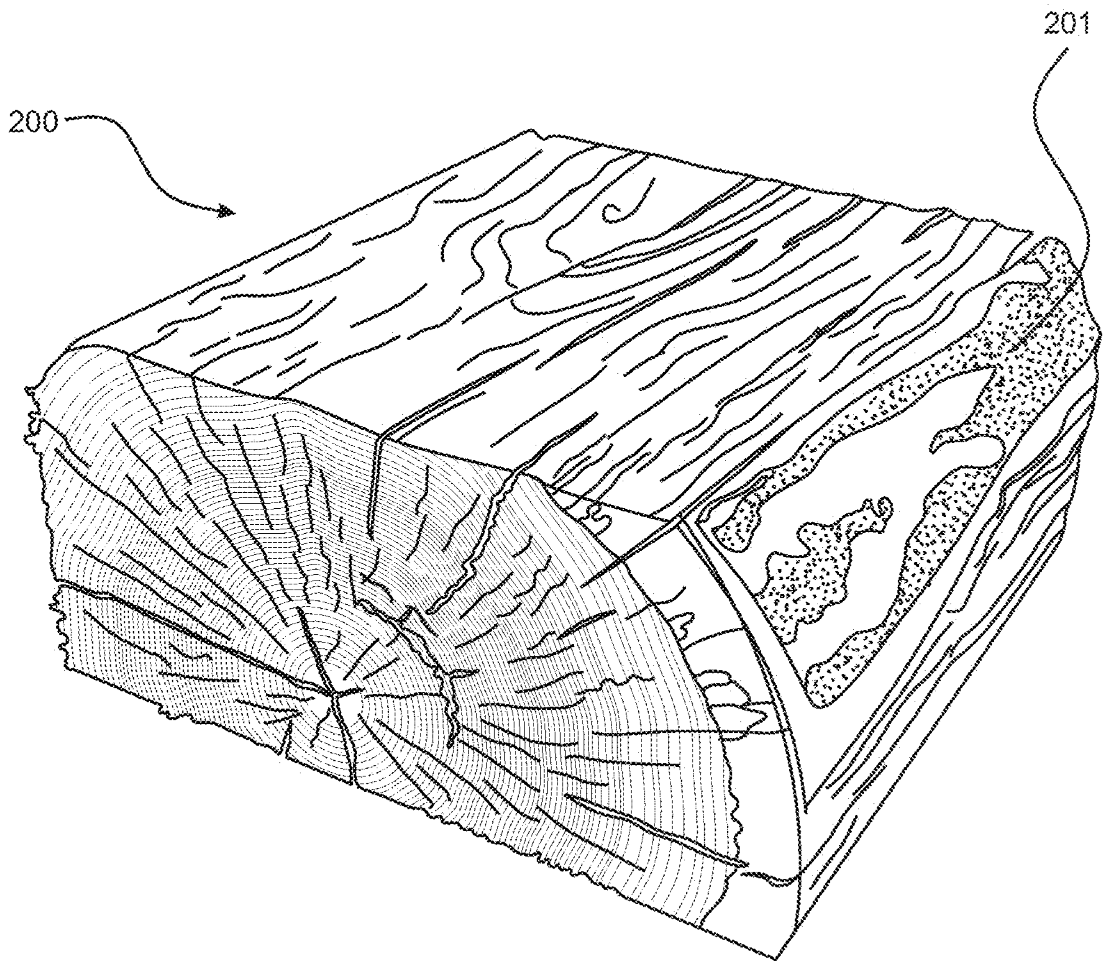
FIG. 2 is a perspective view of a board comprising a wane area.

As shown in FIG. 2, wood boards may have certain characteristics. One such characteristic is wane, where one or more edges 201 of a board 200 are not square. This is expected when cutting square boards from a cylindrical section.

Figure 3A:
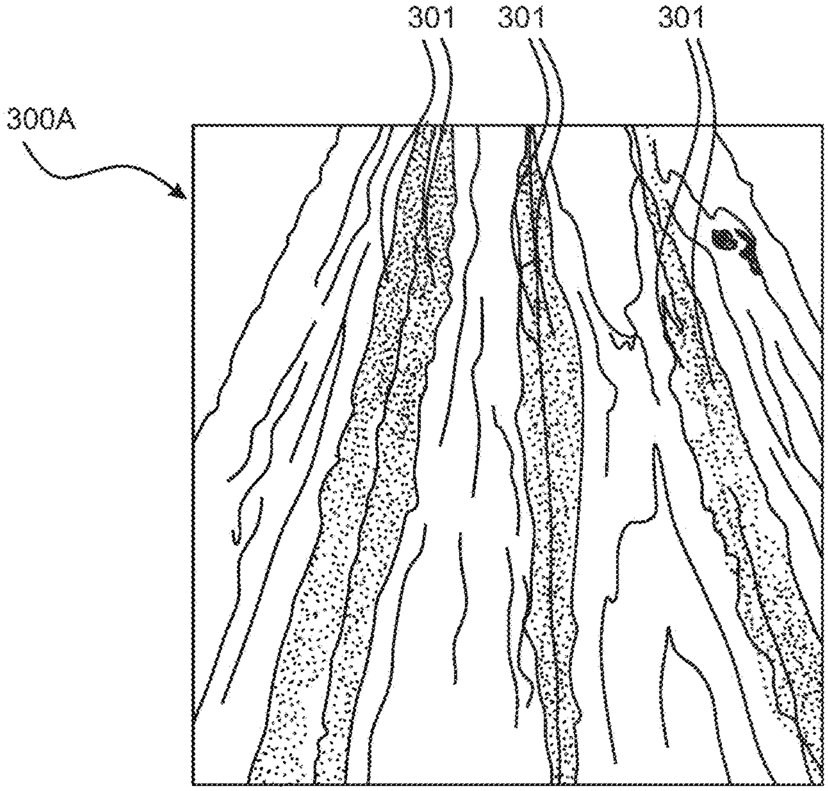
FIG. 3A is an example board layer formed using sequential processing.

FIG. 3A is an example longitudinal layer 300A of CLT formed using sequential processing. The wood boards used to form the longitudinal layer 300A each have some degree of some wane. As shown in FIG. 3A, high density wane areas 301 are placed next to each other within the layer 300A. The presence of areas with a high density of a characteristic, such as wane, within the structure of the CLT may affect the bondline, since the adhesive may only span a limited gap without significant degradation of bond strength.

A specification of CLT may only allow for a certain number of characteristics per area of material. However, the way that CLT is currently processed, where the wood supply is approximately sequentially processed, there is a probability that areas with a high density of characteristics will be concentrated within a given area of the CLT layer, thus leading to a specification failure.

Figure 3B:
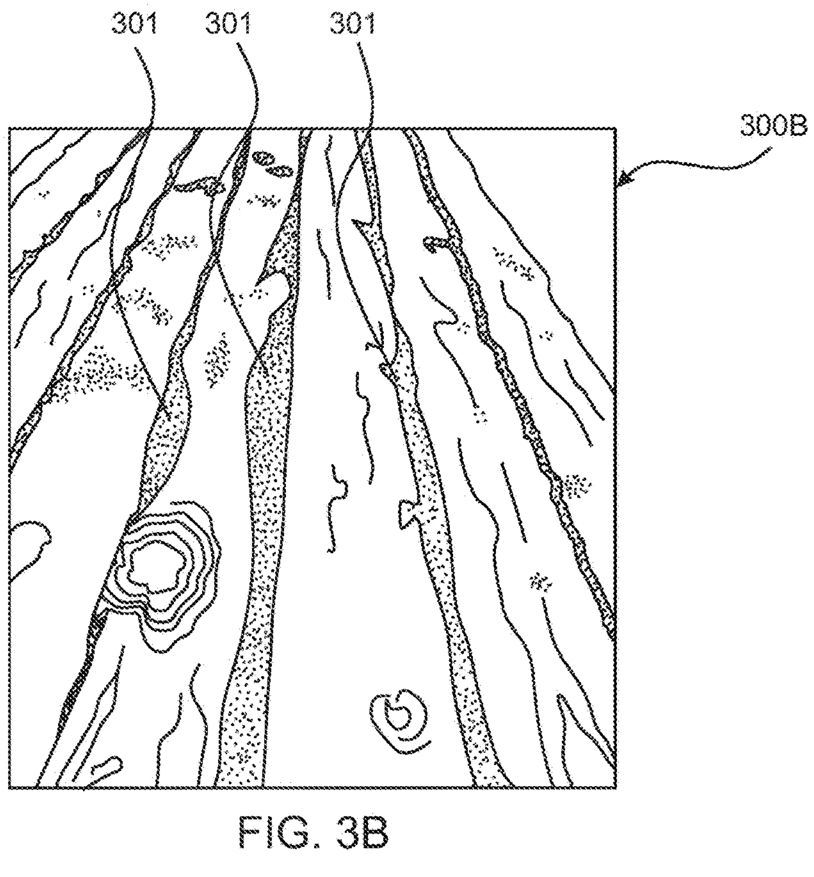
FIG. 3B is an example board layer formed using adaptive lumber management.

FIG. 3B is an example longitudinal layer 300B formed using adaptive lumber management system. The adaptive lumber management uses data analytics and adaptive control strategies to control bondable area. As shown in FIG. 3B, areas with a high density of characteristics 301, such as wane, are spread out within the layer 300B. The high-density areas 301 may be sufficiently spread out within the layer 300B such that the specification may be met while only rejecting a minimal amount of boards.

Figure 4:
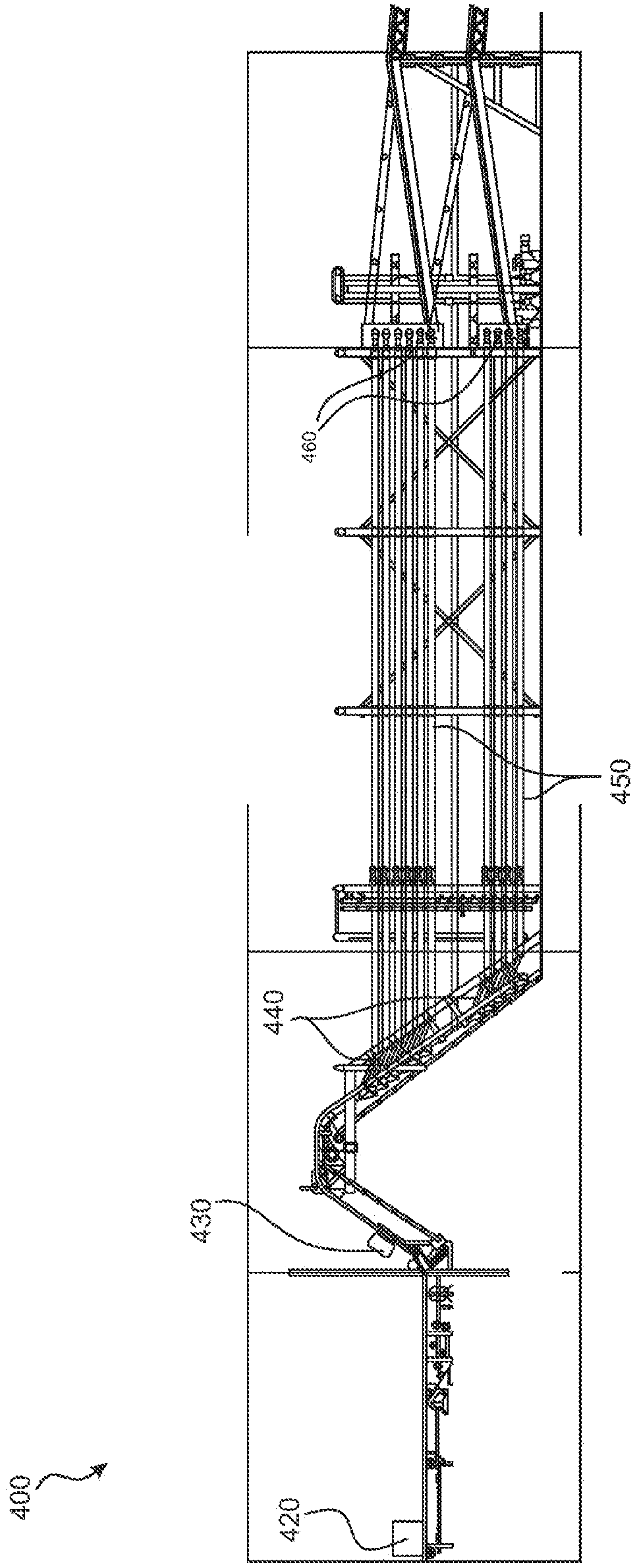
FIG. 4 is a diagram of an adaptive lumber management system, according to an embodiment.

With regards to FIG. 4, an adaptive lumber management system 400 in accordance with the present disclosure is shown. The adaptive lumber management system 400 may comprise a computing system 410, a lumber scanner 420, a sorting mechanism 440, a plurality of trays 450, and one or more tipples 460. In some embodiments, the adaptive lumber management system 400 may further comprise a label scanner 430 and/or one or more manipulators (not shown).

Figure 5:
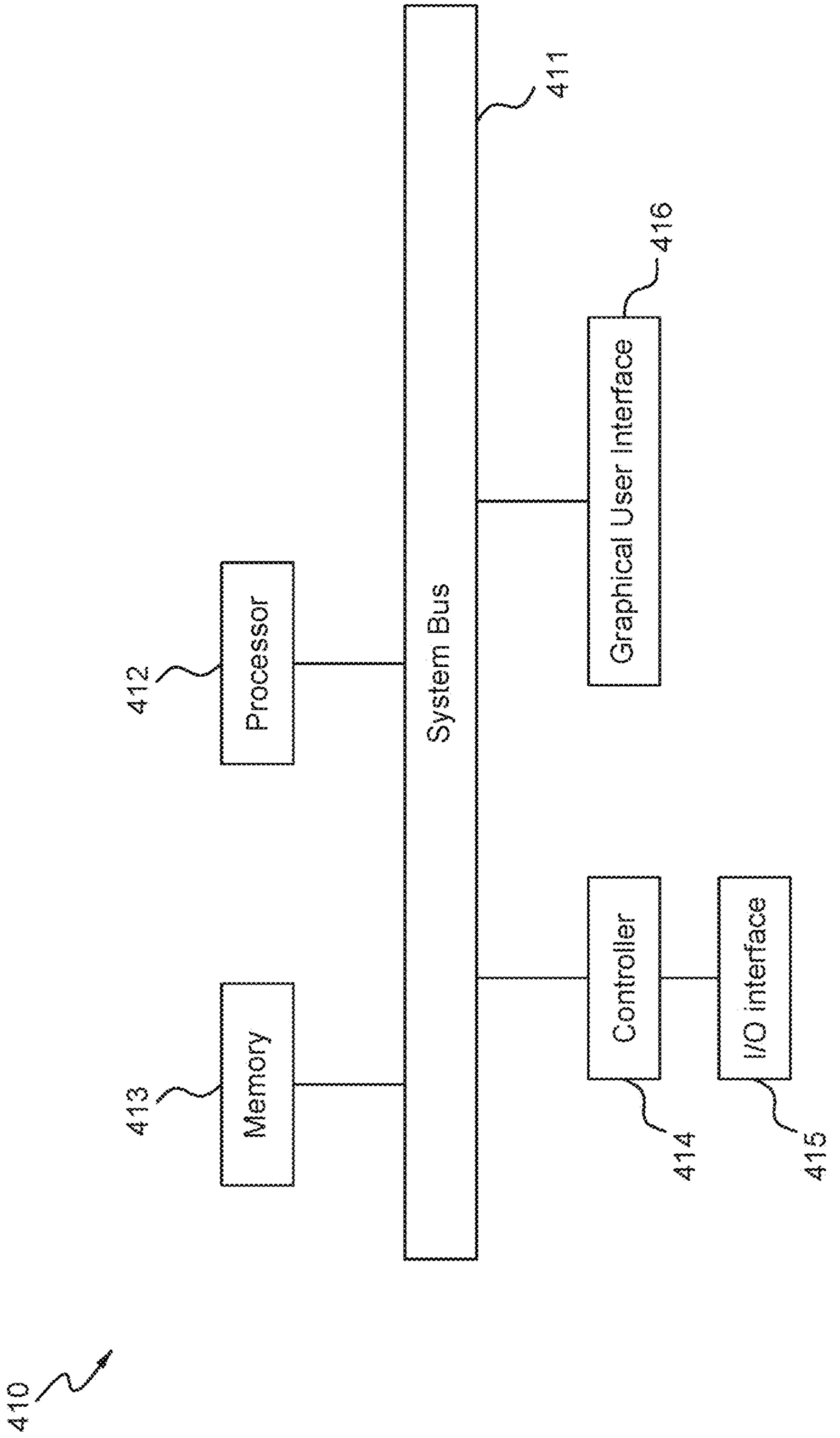
FIG. 5 is a diagram of a computing system, according to an embodiment.

With regards to FIG. 5, the computing system 410 may comprise a communications bus 411, a processor 412, a memory 413, a controller 414, and an I/O interface 415. As will be appreciated by having ordinary skill in the art, there may be more than one processor 412, memory 413, controller 414 and I/O interface 415 in the computing system 410. The computing system 410 may further comprise a graphical user interface (GUI) 416.

The memory 413 may be associated with the processor 412. Non-transitory computing code may be resident on the memory 413 which, when executed by the processor 412, causes the processor to execute instructions. The memory 413 may comprise random access memory (RAM) and/or read only memory (ROM). Such memories include circuitry that allows information to be stored and retrieved. In general, ROMs contain stored data that cannot be modified and data stored in RAM may be read or changed by the processor or other hardware device.

The controller 414 may enable data flow between the processor 412 and the components of the adaptive lumber system. Specifically, the controller 414 may receive instructions from the processor 412 via the communications bus 411. The controller 414 may then send control signals to components of the adaptive lumber system via the I/O interface 415. Similarly, information from the components, such as the status of a component, may be communicated to the processor 412 via the I/O interface 415 and the controller 414.

As noted above, the computing system 410 may further comprise a GUI 416 which may be used to display interactive visual components. The interactive visual components may display information regarding the adaptive lumber management system 400, as well as enable an operator to activate a program and/or component of the adaptive lumber management system 400.

As will be appreciated by one having ordinary skill in the art, the computing system 410 may be implemented in various computing environments having various components and configurations. As such, the computing system described herein is merely illustrative of a computing environment in which the herein describes systems and methods may operate and does not limit the implementation of the herein described systems and methods in computing environments having different components and configurations.

The lumber scanner 420 of the adaptive lumber management system 400 may be configured to perform a scan to record one or more characteristics of a board. Lumber scanners are known in the art and therefore will not be discussed in detail herein. In some embodiments, the lumber scanner 420 may be a linear high grader. The linear high grader may scan each board in a single pass and may utilize multiple sensor technologies, including but not limited to, x-rays for density evaluation, lasers for density evaluation, lasers for geometric profile measurements, dynamic or static measurement of lumber stiffness, and four-sided multi-channel vision to detect visual attributes. Therefore, the lumber scanner 420 may allow for classification and verification of lumber characteristics such as wane, knots, stain, splits, shake, rot, and the like. By way of example only, each board may be enumerated and scanned for characteristics of top and bottom surfaces. The lumber scanner 420 may create a data profile for each board. The data files for each board may be communicated to the processor 412 and stored in the memory 413.

In some embodiments, the data file for a board may comprise a distribution profile of a characteristic of the board. By way of example only, the data file is a distribution profile of a board's wane. However, the data file may comprise information regarding one or more of the following characteristics of a board: twist, crook, bow, cup, splits, checks, color, grain, stain, pitch, pockets, heartwood/sapwood, knots, shake, unsound wood, holes, compression wood, slope of grain, moisture content, specific gravity/density, Modulus of Elasticity/Young's Modulus, bending strength, compression stiffness, compression strength, tensile stiffness, tensile strength, shear modulus, shear strength, torsional strength, torsional shear modulus, hardness, toughness, char rate, flame spread, electrical conductance/resistance, inductance, capacitance, thermal conductance/resistance, dimensional stability, machinability, vapor permeance, dampening, ductility, creep, acoustic absorption, or durability.

The lumber scanner 420 may be configured to place a tracking label on each board. In some embodiments, the tracking label may comprise a tracking barcode. The tracking label may be used to track the boards during downstream processing, as discussed in more detail below.

After exiting the lumber scanner 420, the boards may be singulated and loaded onto individual lugs (not shown). Next, the boards may pass through the label scanner 430. The label scanner 430 may be configured to read the tracking label of each board. In this way, the order of the boards may be established. The information from the label scanner 430 may be communicated to the processor 412 and stored in the memory 413. As will be appreciated by one having ordinary skill in the art, the board order may be tracked using alternative methods.

After passing through the label scanner 430, the boards may be transported to the sorting mechanism 440. The sorting mechanism 440 may comprise a plurality of gates (not shown). Each gate of the plurality of gates may be associated with a tray or a plurality of trays 450 such that when a gate is in an open position, a board will be placed in the tray associated with the gate. In some embodiments, each gate comprises an actuator for opening and closing the gate. The actuator may comprise a pneumatic actuator, an electrical actuator, a hydraulic actuator, or the like. However, as will be appreciated by one having ordinary skill in the art, the use of gates and the like to sort lumber is known in the art, and therefore not discussed in detail herein.

The processor 412 may be configured to make a sorting determination, as discussed in more detail below. Specifically, the processor may determine a target tray of the plurality of trays of the system each board should be placed in. The sorting determination may be based on the data files associated with the plurality of boards. The processor may communicate the target tray for each board to the controller 414, which then sends control signals to the sorting mechanism 440 to activate the actuator of the gate associated with the target tray. The established board order may be used to determine which gate should be activated at a given time.

The plurality of trays 450 may comprise one or more first-tier trays and one or more second-tier trays. Boards sorted into the one or more first-tier trays may be used to create a longitudinal layer of CLT. Boards sorted into the one or more second-tier trays may be used to create a transverse layer of CLT. In some embodiments, the plurality of trays 450 may further comprise one or more general trays. Boards sorted into one or more general trays may be used to create both a longitudinal layer of CLT and a transverse layer of CLT. In some embodiments, the plurality of trays 450 may further comprise one or more rejection trays. Boards sorted into the one or more rejection trays may not be used in the CLT.

Next, one or more tipples 460 are used to pick up the boards from the plurality of trays 450. The processor 412 may be configured to determine specific boards to be used for a layer, as discussed in more detail below. Specifically, as boards are placed into the first-tier trays, the processor 412 may generate a longitudinal board mapping. Similarly, as boards are placed into the second-tier trays, the processor 412 may generate a transverse board mapping. The board mappings may comprise a virtual layup, i.e., assembly, of one or more layers of a composite material. The mappings may be virtual layups selected from a population of virtual layups. The selected virtual layup may optimize a desired result, such as bondable area or aesthetic quality.

The boards to be used for a layer may be from the same tray or may be selected from different trays. The processor 412 may then instruct the controller 414 to send control signals which activate the one or more tipples 460 to carry out the selection. The processor may be further configured to determine a particular order in which the boards should be selected.

The processor 412 may be further configured to determine a designated orientation for each board, as described in more detail below. The processor 412 may instruct the controller 414 to send control signals which activate at least one manipulator to flip, rotate, translate, or otherwise manipulate a board such that the board is in the designated orientation. Additionally, or alternatively, a board may be manipulated to be in the determined position prior to sorting. The manipulator may comprise any device known in the art capable of flipping, rotating, translation or otherwise manipulating a board. In some embodiments, the manipulator may comprise a robotic arm with an end effector.

After selection by one or more tipples 460 and/or manipulation by one or more manipulators, the boards may exit the adaptive lumber management system 400 for further processing by a layup system configured to assemble and glue the plurality of boards to produce a final product.

Figure 6:
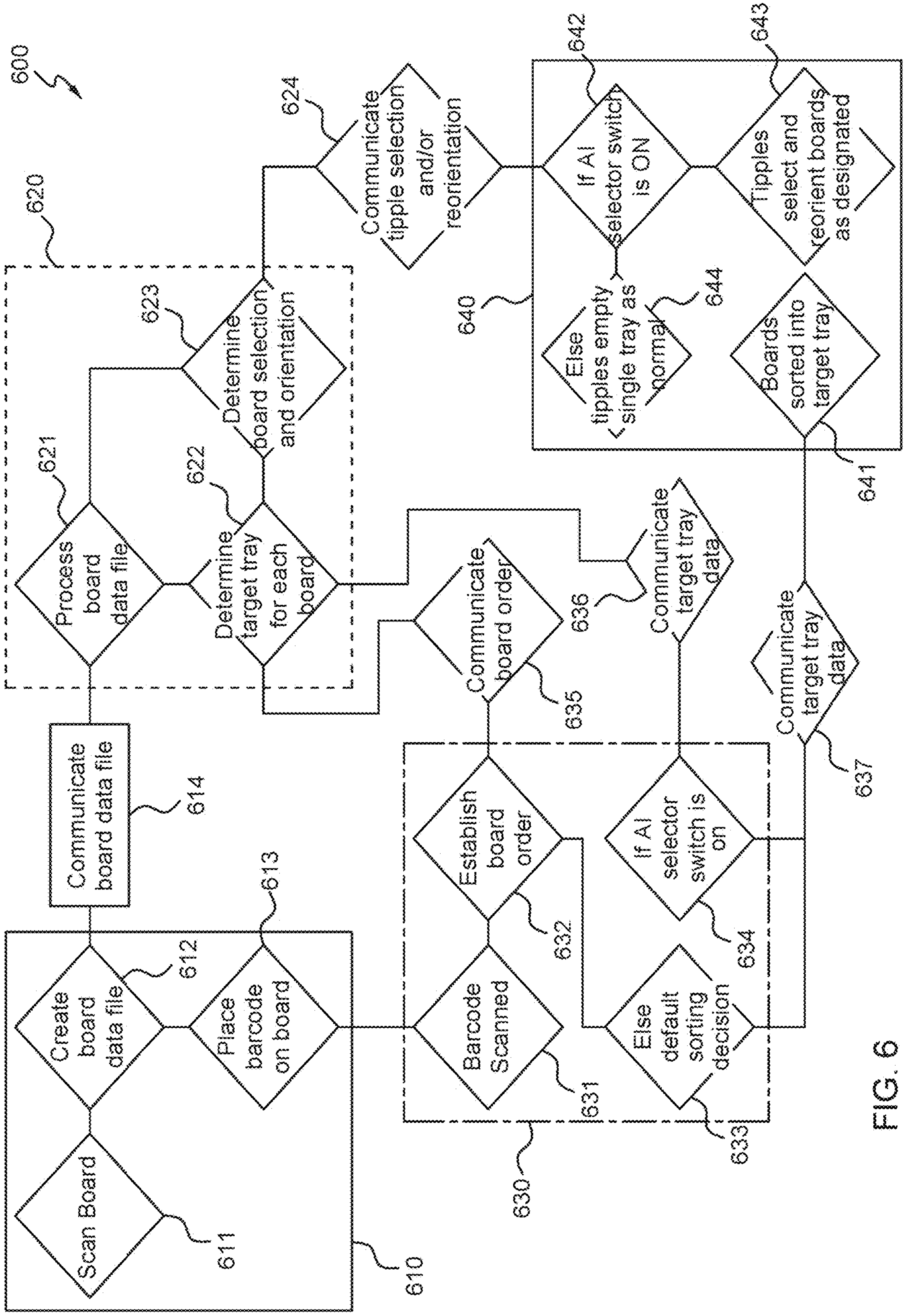
FIG. 6 is a flow chart of a method for adaptive lumber management, according to an embodiment.

With regards to FIG. 6, a flowchart of a method for adaptive lumber management 600 is shown. The method may be performed on the adaptive lumber management system described above. The method may comprise scanning 610, data processing 620, sorting 630, and executing physical commands 640.

The scanning 610 may be performed by the lumber scanner of the system, the data processing may be performed by the processor and memory, the sorting may be performed by the sorting mechanism, and the executing physical commands may be performed by the controller.

Scanning 610 may comprise scanning a board 611, creating a data file containing board characteristic data 612, and placing a label, such as a barcode, on the board 613.

At 614, the data file is communicated to the processor and/or memory. The processor may process the board data file and the data file may be stored in the memory.

At 631, the label scanner may read the label on each board. At 632, the order of boards in the system may be established. The board order data may then be communicated to the processor and memory at 635. At 622, the processor may then determine a target tray for each board. If the AI selector switch is turned on 624, then the target tray determined by the processor 636 is communicated to the controller 637. If the AI selector switch is off, a default sorting is used 633 and communicated to the controller 637. The controller may then send control signals to the sorting mechanism such that each board is sorted into the target tray at 641, as described above.

At 623, the processor may designate specific boards to be used for a layer, as discussed in more detail below. The boards to be used for a layer may be from the same tray or may be selected from different trays. The processor may be further configured to determine a particular order in which the boards should be selected.

At 624, the board selection and orientation is communicated to the controller. If the AI selector switch is on 642, the controller may then send control signals which activate the one or more tipples to carry out the selection. If the AI selector switch is off, one or more tipples empty a single tray as normal at 644.

Figure 7:
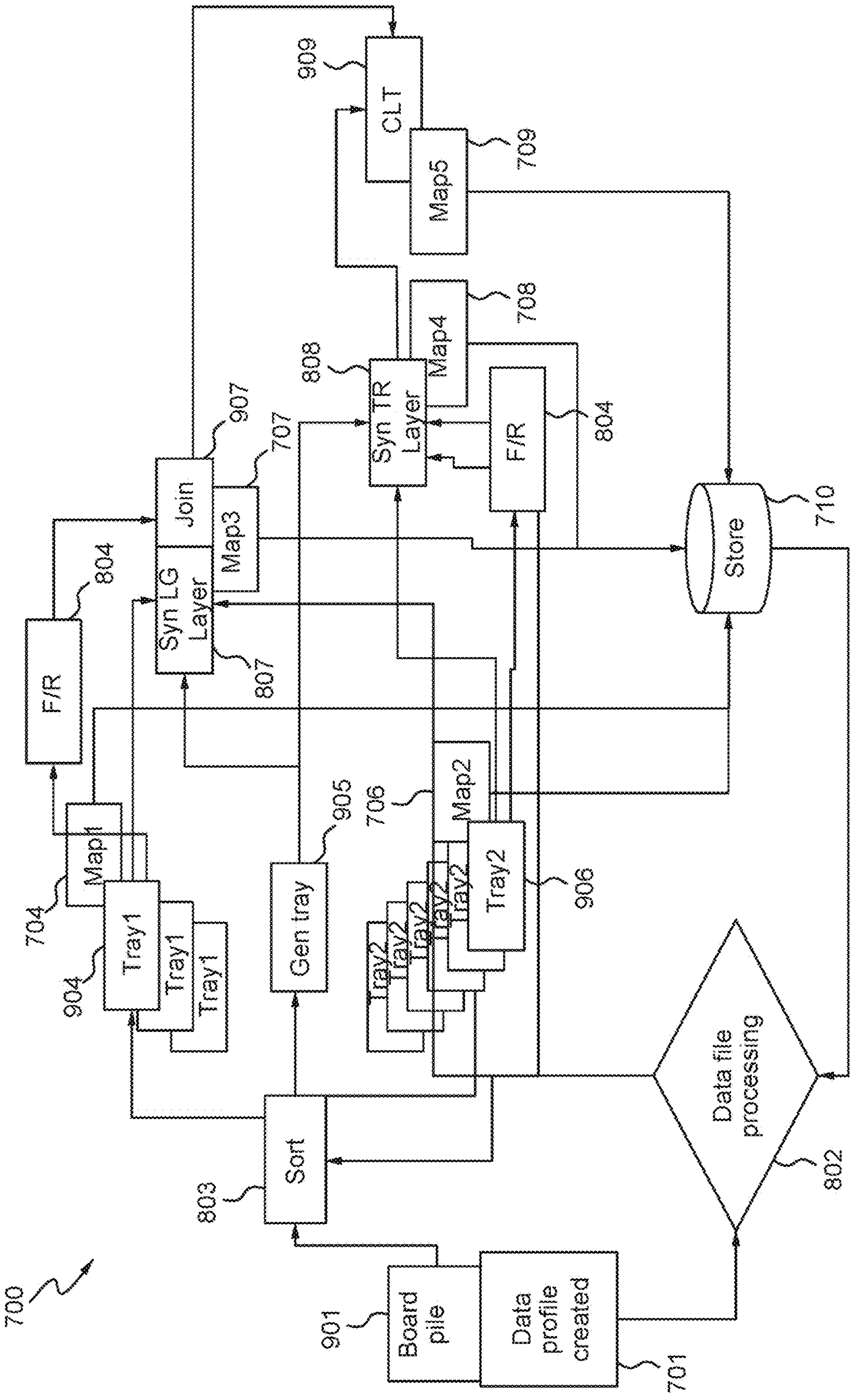
FIG. 7 is a flow chart of logic for adaptive lumber management, according to an embodiment.

With regards to FIG. 7, a logic flowchart 700 for adaptive lumber management shown. Each board from a pile of boards 901 are scanned by a lumber scanner and a data file is created 701 for each board comprising information from the scan, as disclosed above. In the data file, a board may be designated LS #(x,y,z), where # is a unique number assigned to the board, and x,y is the x and y position within the board, and z is equal to a numerical value (e.g., 0, 1) indicating a top or bottom surface of the board.

At 802, the data profile for each board is processed by the processor. In some embodiments, the processor may determine a target tray for each board based on location of a characteristic, percentage of a characteristic, or both.

The target tray determination may depend on the number of trays (N). The plurality of trays may comprise one or more first-tier trays 904 and one or more second-tier trays 906, as discussed above. There may also be one or more general trays 905 and/or one or more rejection trays (not shown). Boards sorted into a second-tier tray 904 will be used for a transverse layer in the final CLT (i.e., transverse board) and boards sorted into a first-tier tray 906 will be used for a longitudinal layer in the final CLT (i.e., longitudinal board). Boards sorted into general tray 905 may be used for either a transverse layer or a longitudinal layer in the final CLT. Boards sorted into one or more rejection trays (not shown) may not be used in the final CLT.

The processor may make a sorting determination based on location of a characteristic, percentage of a characteristic, or both.

In location-based sorting, a board may be segmented into $$\frac{N}{2}$$

segments where a location of a characteristic is mapped. The target tray may be determined by location of the characteristic along the length of the board, where L/2 is the board width. The delineation may go from 0 to $$L/\frac{N}{2} * n$$

and incremented with n until $$n = \frac{N}{2}.$$

N may be defined as the number of trays, as indicated above. L may be defined as the length of the board.

In percentage-based sorting, the percentage of the characteristic is segmented into Equation 1, with delineations according to Equation 2, wherein n spans from 1 to $$\frac{N}{2}.$$

$$(\text{Characteristic}_{\text{max}} - \text{Characteristic}_{min})/\left(\frac{N}{2}\right) \quad \text{Eq. 1}$$

$$\text{Attribute}_{min}\frac{\text{Attribute}_{max} - \text{Attribute}_{min}}{\frac{N}{2}} * (n) \quad \text{Eq. 2}$$

N may be defined as the number of trays, as indicted above. $\text{Characteristic}_{max}$ may be defined as a maximum percentage of a characteristic within a cross-section or area. $\text{Characteristic}_{min}$ may be defined as a minimum percentage of a characteristic within the same cross-section or area.

Boards having a high density of the characteristic on a top side may be sorted into one tray and boards having a high density of the characteristic on a bottom side may be sorted into another tray. Although the trays are linearly demarcated in the foregoing examples, they do not have to be. Further, N may be a dynamic variable due to availability requirements (e.g., when $\text{Characteristic}_{max}$ and/or $\text{Characteristic}_{min}$ increase).

At 803, boards may be sorted into their respective target trays, as discussed above.

As boards are placed into the first-tier trays 904, a first longitudinal board mapping (Map1) 704 may be created. Map1 704 may indicate the presence of a characteristic on top and bottom sides of the layer by aggregating the presence of the characteristic of each board. Each longitudinal board may have a mapped characteristic profile and designated per its potential position in Map1 704. The designation may comprise $L_{i,j}$(x,y,z), where x and y are dimensions along the face, z is equal to a numerical value (e.g., 0, 1) indicating a top or bottom surface of the board, and i,j represent the layer and location of the longitudinal board in the layer.

In some embodiments, multiple longitudinal boards may be joined 907 end to end to create a complete longitudinal board. Each individual board of the complete longitudinal board designated $L_{i,j}$(x,y,z), may be designated as LS #(x, y,z). Each individual board of the complete longitudinal board may be selected to ensure that the characteristic is distributed such that the density of the characteristic is not in excess of the specification derived from the area distribution. For example, when a plurality of longitudinal boards, LS #(x,y,z) are aligned into a complete longitudinal board, $L_{i,j}$(x,y,z), such that the presence of the characteristic is not concentrated in a given x,y,z location for each $L_i$ board in the range of j within j−d1 to j+d1, where d1 defines the adjacent longitudinal boards LS #(x,y,z).

A second longitudinal board mapping (Map3) 707 may be created. Map3 707 may indicate the presence of the characteristic on top and bottom sides of a synthesized longitudinal layer 807.

Similarly, as boards are placed into the second-tier trays 906, a transverse board mapping (Map2) 706 is generated. Map2 706 may indicate the presence of the characteristic on top and bottom sides of layers by aggregating the presence of the characteristic of each board. A transverse board may be given a designation of $T_{m,n}$(x,y,z), where x and y are dimensions along the face, z is equal to a numerical value (e.g., 0, 1) indicating a top or bottom surface of the board, and m,n represent the layer and location of the longitudinal board in the layer.

Transverse boards, $T_{m,n}$(x,y,z), are sorted and selected such that transverse boards that have a high presence of the characteristic on a top and/or bottom and/or side are not concentrated in a given x,y,z location for each $T_m$ board, in the range of n within m−d2 to m+d2, where d2 defines the adjacent transverse boards.

A plurality of transverse boards may be laid edge to edge to form a transverse layer of CLT. The plurality of transverse boards may be sequentially labeled $T_{a,n}$(x,y,z), where n equals the total number of transverse boards in a layer and a is a numerical value representing the layer. The layer may be modeled and represented by $T_A$(X,Y,Z), where X and Y are global dimensions referring to the layer and the transverse board and Z is equal to a numerical value (e.g., 0, 1) indicating a top or bottom surface of the board.

A second transverse board mapping (Map4) 708 may be created. Map4 708 may indicate the presence of the characteristic on top and bottom sides of a synthesized transverse layer 808.

A plurality of longitudinal boards may be laid edge to edge to form the transverse layer. The plurality of longitudinal boards may be sequentially labeled $L_{b,i}$(x,y,z), where j equals the total number of longitudinal boards in a layer and b is a value representing the layer. The layer may be modeled and represented by $L_B$(X,Y,Z), where X and Y are global dimensions referring to the layer and the transverse board and Z is equal to a numerical value (e.g., 0, 1) indicating a top or bottom surface of the board.

The interface formed by $L_B$(X,Y,Z) and $T_A$(X,Y,Z') and the interface formed by $T_A$(X,Y,Z') and $L_{B+2}$(X,Y,Z) may be modeled to ensure that the areal density of the characteristic does not exceed the specification. Specifically, an interface mapping (Map5) 709 may be generated. Map5 709 may indicate the presence of the characteristic on the interface between the formed stack (presence of characteristic on the top longitudinal layer and presence of characteristic on the bottom of the transverse layer) and the presence of the characteristic on the interface of the top and bottom of the joined synthesized longitudinal layer for a CLT 909. Additional permutations may be performed until mappings are generate for a desired number of layers.

One or more of the mappings 704, 706, 707, 708, 709 may then be evaluated to determine if the density of the characteristic meets the specification for one or more layers. If the specification is not met, then a modified mapping may be generated. The modified mapping may change the position of one or more boards within the layer(s) or the orientation of a board. For example, after Map1 704 and Map2 706 are generated, they may be evaluated for the density of the characteristic. If the density of the characteristic of Map1 704 and/or Map2 706 exceeds the specification, one or more boards may be flipped and/or rotated 804 such that the specification is met. All mappings may be stored 710 in the memory of the adaptive lumber management system.

In some embodiments, the adaptive lumber management system may be configured to maximize the bondable area. For example, areas with a high density of a certain characteristic may be clustered on the top surface of the top layer of the CLT and the bottom surface of the bottom layer. Additionally, or alternatively, the adaptive lumber management system may be configured to maximize the aesthetic qualities of the CLT. For example, in instances where it is desired to hide a certain characteristic for aesthetic purposes, and not to maximize bondable area, the high-density areas of that characteristic may be clustered in the unexposed surfaces of CLT, where it will not be seen.

Multiple mappings may be generated to create a population of mappings. The mapping which achieves the desired effects may be selected from the population. For example, the mapping which provides the greatest bondable area or the best aesthetic qualities may be selected from the population. The selected mappings may be used as seeds for the next population. The population may be updated with mappings after each iteration and solutions may be optimized using artificial intelligence. In some embodiments, the solutions are optimized using an evolutionary algorithm.

Having thus described in detail a preferred selection of embodiments of the present invention, it is to be appreciated and will be apparent to those skilled in the art that many physical changes could be made to the adaptive lumber management system without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A method for planning an assembly of a laminated timber product comprising at least one layer comprising two or more boards, the method comprising:

- scanning each board in a plurality of boards for one or more of a plurality of characteristics of the board;
- identifying each board in the plurality of boards as belonging to one of a plurality of groups based on the one or more of the plurality of characteristics of the board; and
- selecting a subset of the plurality of boards from a one or more of the plurality of groups of boards for assembly into the at least one layer of two or more boards of the laminated timber product; and
- creating a map that indicates a presence of one or more of a plurality of characteristics of the at least one layer of the two or more boards selected from the subset of the plurality of boards for assembly into the laminated timber product based on a respective position in the map, and the one or more of the plurality of characteristics, of each board in the subset of the plurality of boards.

2. The method of claim 1, wherein creating the map comprises selecting the respective position in the map of each board in the subset of the plurality of boards.

3. The method of claim 2, wherein selecting the respective position in the map of each board in the subset of the plurality of boards, comprises selecting the respective position in the map of each board in the subset of the plurality of boards based on the plurality of characteristics of each board.

4. The method of claim 3, wherein selecting the respective position in the map of each board in the subset of the plurality of boards, comprises selecting the respective position in the map of each board in the subset of the plurality of boards to distribute the presence of the one or more of the plurality of characteristics over an area of the at least one layer of the laminated timber product.

5. The method of claim 4, wherein selecting the respective position in the map of each board in the subset of the plurality of boards to distribute the presence of the one or more of the plurality of characteristics over the area of the at least one layer of the laminated timber product, comprises selecting the respective position in the map of each board in the subset of the plurality of boards to distribute the presence of the one or more of the plurality of characteristics over the area of the at least one layer of the laminated timber product such that a density of one or more of the plurality of characteristics in the area of the at least one layer of the laminated timber product does not exceed a threshold.

6. The method of claim 5, further comprising creating a second map of a second subset of the plurality of boards, different than the subset of the plurality of boards, to be selected from the one or more of the plurality of groups for assembly into a second layer of the laminated timber product, wherein the second map indicates a presence of one or more of a plurality of characteristics of the second layer of the laminated timber product based on a respective position in the second map, and the one or more of the plurality of characteristics, of each board in the second subset of the plurality of boards.

7. The method of claim 6, wherein creating the second map comprises selecting the respective position in the second map of each board in the second subset of the plurality of boards.

8. The method of claim 7, wherein selecting the respective position in the second map of each board in the second subset of the plurality of boards, comprises selecting the respective position in the second map of each board in the second subset of the plurality of boards based on the plurality of characteristics of each board.

9. The method of claim 8, wherein selecting the respective position in the second map of each board in the second subset of the plurality of boards, comprises selecting the respective position in the second map of each board in the second subset of the plurality of boards to distribute the presence of the one or more of the plurality of characteristics over an area of the second layer of the laminated timber product.

10. The method of claim 9, wherein selecting the respective position in the second map of each board in the second subset of the plurality of boards to distribute the presence of the one or more of the plurality of characteristics over the area of the second layer of the laminated timber product, comprises selecting the respective position in the second map of each board in the second subset of the plurality of boards to distribute the presence of the one or more of the plurality of characteristics over the area of the second layer of the laminated timber product such that a density of one or more of the plurality of characteristics in the area of the second layer of the laminated timber product does not exceed a second threshold.

11. The method of claim 10, wherein the map comprises a first map, wherein the at least one layer of the laminated timber product comprises a first layer of the laminated timber product, further comprising modifying the first map or the second map when the density of one or more of the plurality of characteristics in the area of the first layer, the second layer, or both layers of the laminated timber product, exceeds a third threshold.

12. The method of claim 11, wherein the subset of the plurality of boards comprises a first subset of the plurality of boards, and wherein modifying the first map or the second map when the density of one or more of the plurality of characteristics in the area of the first layer, the second layer, or both layers of the laminated timber product, exceeds the third threshold comprises changing an orientation, or selecting a new respective position in the first map, or the second map, of at least one of the respective boards in the first subset, or the second subset, of the plurality of boards.

13. The method of claim 11, further comprising:

creating an interface map of the first layer of the laminated timber product and the second layer of the laminated timber product selected for assembly into the laminated timber product that indicates a presence of the one or more characteristics at an interface between the first layer of the laminated timber product and the second layer of the laminated timber product based on the first map and the second map; and modifying the first map or the second map when a density of one or more of the plurality of characteristics in the area of the first layer of the laminated timber product, the second layer of the laminated timber product, or at the interface between the first layer of the laminated timber product and the second layer of the laminated timber product, exceeds a threshold.

14. The method of claim 1, further comprising:

creating a data file for each board comprising the scanned one or more of the plurality of characteristics of the board;

accessing the data file for each board; and wherein identifying each board in the plurality of boards as belonging to one of the plurality of groups based on the one or more of the plurality of characteristics of the board, comprises identifying each board in the plurality of boards as belonging to one or more of the plurality of groups based on the one or more of the plurality of characteristics of the board accessed from the data file.

15. The method of claim 1, wherein identifying each board in the plurality of boards as belonging to one of the plurality of groups based on the one or more of the plurality of characteristics of the board, comprises identifying each board in the plurality of boards as belonging to one of the plurality of groups based on a location of the characteristic, a percentage of the characteristic with a selected-cross section or area of the board, or both, of the one or more of the plurality of characteristics of the board.

* * * * *